United States Patent
Skjetne

(10) Patent No.: US 9,079,377 B2
(45) Date of Patent: Jul. 14, 2015

(54) SANDWICH STRUCTURED CONSTRUCTION ELEMENT

(75) Inventor: Pål Skjetne, Ljungbyhed (SE)

(73) Assignee: Ecopals AB, Helsingborg (SE)

( * ) Notice: Subject to any disclaimer, the term of this patent is extended or adjusted under 35 U.S.C. 154(b) by 806 days.

(21) Appl. No.: 13/322,059

(22) PCT Filed: May 26, 2010

(86) PCT No.: PCT/SE2010/050565
§ 371 (c)(1),
(2), (4) Date: Feb. 7, 2012

(87) PCT Pub. No.: WO2010/138066
PCT Pub. Date: Dec. 2, 2010

(65) Prior Publication Data
US 2012/0164388 A1    Jun. 28, 2012

(30) Foreign Application Priority Data
May 26, 2009 (SE) ..................................... 0900708

(51) Int. Cl.
*B32B 3/00* (2006.01)
*B32B 3/12* (2006.01)
(Continued)

(52) U.S. Cl.
CPC ... *B32B 3/28* (2013.01); *B32B 3/12* (2013.01); *B32B 3/266* (2013.01); *B32B 27/04* (2013.01);
(Continued)

(58) Field of Classification Search
CPC .. B32B 2250/40; B32B 2419/00; B32B 3/28; B32B 3/12; B32B 3/00; E04C 2002/3416; E04C 2002/3422; E04C 2002/3427; E04C 2/3405; Y10T 156/1038
USPC ............ 428/172, 178, 166; 52/783.11, 783.1, 52/789.1, 793.1
See application file for complete search history.

(56) References Cited

U.S. PATENT DOCUMENTS

| | | |
|---|---|---|
| 2,809,908 A | 10/1957 | French |
| 3,011,602 A | 12/1961 | Ensrud et al. |

(Continued)

FOREIGN PATENT DOCUMENTS

| | | |
|---|---|---|
| CA | 2384078 A1 | 3/2001 |
| DE | 29609442 U1 | 9/1996 |

(Continued)

OTHER PUBLICATIONS

"International Application Serial No. PCT/SE2010/050565, International Search Report mailed Sep. 9, 2010", 4 pgs.
(Continued)

*Primary Examiner* — Catherine A Simone
(74) *Attorney, Agent, or Firm* — Alston & Bird LLP

(57) ABSTRACT

The invention relates to a structural member comprising a first and a second board member that are arranged in parallel to each other, and a filler element arranged between the first board member and the second board member. The filler element is a continuous sheet with a sheet plane that is substantially parallel to the first and second board member, and is moulded or vacuum-moulded so that cone-shaped cavity structures project outward from the sheet plane. The cone-shaped cavity structures are provided as truncated cones having a top and bottom, both having a substantially circular shape. One side of the sheet plane has a continuous, flat surface and the cone-shaped cavity structures project outward on the other side of the sheet plane. The cone-shaped cavity structures have a cone angle of approx. 5-45°.

13 Claims, 13 Drawing Sheets

(51) Int. Cl.
  *B32B 3/28* (2006.01)
  *B32B 3/26* (2006.01)
  *B32B 27/04* (2006.01)
  *B32B 27/36* (2006.01)
  *B32B 29/08* (2006.01)

(52) U.S. Cl.
  CPC ............... *B32B 27/36* (2013.01); *B32B 29/08* (2013.01); *Y10T 428/24562* (2015.01); *Y10T 428/24661* (2015.01)

(56) References Cited

U.S. PATENT DOCUMENTS

| | | |
|---|---|---|
| 3,865,679 A | 2/1975 | Hale |
| 3,876,492 A | 4/1975 | Schott |
| 4,251,970 A | 2/1981 | Home |
| 5,444,959 A | 8/1995 | Tesch |
| 6,253,530 B1 | 7/2001 | Price et al. |
| 8,402,715 B2 * | 3/2013 | Uhllg et al. ............... 52/783.11 |
| 2003/0101682 A1 | 6/2003 | Crye et al. |
| 2006/0254205 A1 | 11/2006 | Swiszcz et al. |

FOREIGN PATENT DOCUMENTS

| | | |
|---|---|---|
| DE | 19942922 A1 | 3/2001 |
| EP | 1365082 A1 | 11/2003 |
| FR | 2630372 A1 | 10/1989 |
| GB | 747504 A | 4/1956 |
| GB | 2092192 A | 8/1982 |
| GB | 2394483 A | 4/2004 |
| SE | 515065 C2 | 6/2001 |
| WO | WO-01/30201 A1 | 5/2001 |
| WO | WO-2005/053946 A2 | 6/2005 |
| WO | WO 2006069707 A1 * | 7/2006 |
| WO | WO-2008/048772 A1 | 4/2008 |

OTHER PUBLICATIONS

European Patent Office, Extended European Search Report for Application No. 10780887.5, Aug. 21, 2013, 4 pages, Germany.

Federal Service for Intellectual Property (Rospatent), Office Action for Russian Application No. 201152967/05(079721), dated Dec. 3, 2013, 6 pages, Russia.

"International Application Serial No. PCT/SE2010/050565, International Preliminary Report on Patentability dated Nov. 29, 2011", 5 pgs.

"International Application Serial No. PCT/SE2010/050565, Written Opinion mailed Sep. 9, 2010", 4 pgs.

* cited by examiner

SANDWICH STRUCTURED CONSTRUCTION ELEMENT

RELATED APPLICATIONS

This application is a nationalization under 35 U.S.C. 371 of PCT/SE2010/050565, filed May 26, 2010 and published as WO 2010/138066 A1 on Dec. 2, 2010, which claims priority to Sweden Patent Application No. 0900708-9, filed May 26, 2009; which applications and publications are incorporated herein by reference in their entirety.

TECHNICAL FIELD

The present invention generally relates to structural members intended for structures in, inter alia, the wood, furniture, building, and transport industry. More particularly, the invention relates to structural members of composite, lightweight board materials.

BACKGROUND

When designing, for instance, furniture, buildings and vehicles, it is important that the constituent members of the structures are durable and have good strength properties, e.g. that they have good flexural rigidity and bending strength. This requirement is often contradicted by other desirable criteria, such that they should have low weight, be worth their price, be environmentally friendly and have an attractive appearance. The criteria of low weight, low price and environmental friendliness also mean that it usually is desirable that the material consumption when manufacturing the structural members is as low as possible.

Previously, it has been difficult to combine all these desirable criteria in one and the same structural material. Traditionally used types of material, such as solid wood, chip boards, masonite, MDF, and different forms of laminates weigh a lot, are often expensive, and require a relatively large material consumption during manufacture. Metals and metal alloys have similar advantages and disadvantages. Plastics and similar polymer materials, on the other hand, are often light and cost little to produce, but exhibit lower durability and strength, are not as environmentally friendly, and usually do not have the desired appearance. Composite materials comprising, for example, carbon fibre or glass fibre are often very strong and durable, but cost a lot and do not always provide the desired aesthetic impression.

Also structural members in the form of two parallel, outer boards of a more solid material, with a lighter and less material-consuming material therebetween, have been developed. Such structural members weigh little, and sometimes cost less than more continuously solid materials, but are usually not as durable.

Accordingly, there is a desire and a need for structural members of a material which is strong, has low weight, costs little to produce, and is environmentally friendly and preferably also aesthetically pleasing.

PRIOR ART

It is known, for example from U.S. Pat. No. 2,809,908, to provide a construction panel for doors that costs little to produce, and that is sound and heat insulating. The construction panel comprises two parallel boards of plywood or similar board material, between which a filler element of a fibrous material, such as paper pulp, is arranged. The filler element is moulded into a sheet with hollow structures extending alternately upward and downward from the plane of the sheet. In relation to the plane of the sheet, the structures have inclined walls, an open bottom, and a top having a surface that is parallel to the plane of the sheet. The structures are arranged in parallel and perpendicular rows relative to each other.

It is known, from patent document SE515065, to provide structural members for furniture that have two parallel board-shaped members, between which spacing members are arranged. The spacing members, which may be of different materials, are tubular or cylindrical and arranged so that their symmetry axes are parallel to each other and so that one of their short ends attaches to one board member, whereas the other short end attaches to the other board member, It is known, from patent document WO2005/053946 A2, to provide a panel structure made from two parallel sheets from which hollow, cone-shaped structures extend toward each other so that they meet in a point of attachment connecting the two sheets to each other. The cones cause a gap to form between the sheets, and create a row of voids with waist-shaped support columns in the gap. Reinforcing members, having a longitudinal extension, can be inserted into the voids to give the panel additional stability.

It is also known, for example from patent documents U.S. Pat. No. 6,253,530, WO2008/048772, US2003/0101682 and DE29609442U U1, to provide panels with parallel board-shaped members that have an intermediate, honeycomb-shaped filler element, for example of paper, with hexagonal unit cells.

Patent documents GB2092192 A, U.S. Pat. Nos. 3,876,492 A, 4,251,970, US2006/02544205, EP1365082 and GB2394483 disclose related art.

OBJECT OF THE IVENTION

It is an object and a problem to be solved of the present invention to produce a structural member that is strong and durable, in particular flexurally rigid and resistant to bending, and which furthermore has a low weight, costs little to produce, and is preferably environmentally friendly and recyclable.

SUMMARY OF THE INVENTION

The object of the invention is achieved by means of a structural member that, because of its design, provides the desired properties. The structural member comprises a first and a second board member, which are arranged in parallel to each other, and a filler element that is arranged between the first board member and the second board member. The filler element is a continuous sheet, with a sheet plane that is substantially parallel to the first and the second board member and that is moulded or vacuum-moulded so that a first set of cone-shaped cavity structures project outward from the sheet plane. The first set of cone-shaped cavity structures are provided as truncated cones having a top and a bottom, both having a substantially circular shape. One side of the sheet plane has a continuous, flat surface, whereas the cone-shaped cavity structures project outward on the other side of the sheet plane. The cone-shaped cavity structures have a cone angle of approx. 5-45°, or preferably approx. 9-25°. The design of the filler element with the cone-shaped cavity structures, all projecting outward in the same direction and having a minimum cone angle, contributes to the durability, flexural rigidity and bending strength of the structural member and can, for example, be made from recycled cellulose pulp, which also can be recycled once again.

In one embodiment, the cone-shaped cavity structures (10) in the first set are arranged relative to each other so that no continuous line of weakness is formed in the transverse, longitudinal or diagonal directions of the board, which further contributes to the durability and flexural rigidity of the structural member.

In one embodiment, the cone-shaped cavity structures in the first set are arranged in parallel rows relative to each other, with an offset relative to each other, so that no continuous line of weakness is formed in the transverse and longitudinal direction of the board, In this way, the structural member obtains increased flexural rigidity in its transverse and longitudinal directions.

In one embodiment, the cone-shaped cavity structures in the first set are arranged in rows parallel to the long and short sides of the filler element, without offset relative to each other, so that continuous lines of weakness are formed in the transverse and longitudinal directions of the board. In this way, the structural member obtains increased flexibility in its transverse and longitudinal directions.

In one embodiment, the cone-shaped cavity structures in the first set are arranged in rows parallel to the long and short sides of the filler element, with an offset relative to each other, so that continuous lines of weakness are formed only in one of the transverse and longitudinal directions of the board.

In one embodiment, the structural member further comprises a second set of cone-shaped cavity structures, placed between the cone-shaped cavity structures in the first set in such a way that no continuous line of weakness is formed in any of the transverse, longitudinal or diagonal directions of the board.

In one embodiment, the cone-shaped cavity structures in the first set are interconnected to adjacent cone-shaped cavity structures by intermediate bridges.

In one embodiment, the tops of the cone-shaped cavity structures in the first and/or the second set have a limiting surface, and, in another embodiment, a recess.

In one embodiment, the filler element is made of vacuum-moulded cellulose pulp, which can be reinforced with polylactic acid (PLA).

In another embodiment, the filler element is made of one of moulded wood substitute, composite, aluminium, plastic or steel.

In one embodiment, the first and second board members are made of one of the materials wood, wood substitute, composite, paper, aluminium, plastic or steel, or of combinations thereof.

In one embodiment, the structural member is provided with a filler element made of vacuum-moulded cellulose pulp and with a first and a second board member made of one of the materials wood, wood substitute, composite, paper, aluminium, plastic or steel, or of combinations thereof.

BRIEF DESCRIPTION OF THE FIGURES

The invention is described more closely in the following description with reference to the attached figures, in which.

DETAILED DESCRIPTION

The structural member according to the present invention provides a material with high strength, durability, bending resistance and flexural rigidity, at the same time as it is light and cheap, and can be made environmentally friendly, recyclable, and can have a desired appearance. These properties are achieved in that the structural member is provided according to the following description and in accordance with the definition of the invention that is specified in claim 1. Generally speaking, the structural member comprises two parallel board members, between which a filler element, comprising circular cavity structures in the form of truncated cones standing perpendicularly to the board members, is arranged.

The material in the board members and the cavity structure can, for example, be wood, aluminium, plastic, wood substitute, composite material, paper or steel, with the same material throughout all parts or a selected combination of materials in the different parts of the structural member. In the present description, the invention is exemplified for the most part by embodiments in which the filler element is of a cellulose fibre-based material and is of low weight, at the same time as it is designed to have improved strength and durability properties in relation to similar known materials. The strong and durable design is achieved through the geometrical, three-dimensional structure of the filler element according to the present invention, and can also be reinforced through the choice of material, for example through reinforced fibre interconnections in the cellulose pulp and additions of other types of fibres and biological substances. The filler element can advantageously be based on recycled cellulose fibre, such as recycled paper, which makes this embodiment of the structural member exceptionally environmentally friendly.

Figure 1:
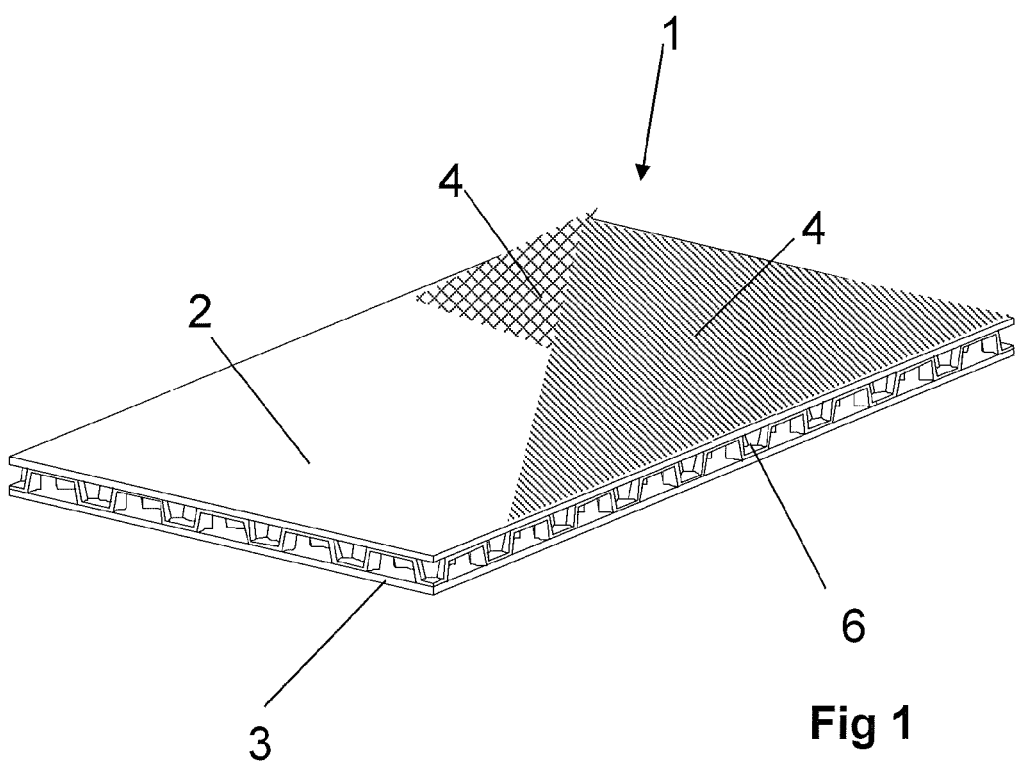
FIG. 1 shows a structural member according to one embodiment of the invention.

FIG. 1 shows a structural member 1 according to one embodiment of the invention. The structural member has a first board member 2 and a second board member 3, which are arranged at a certain distance parallel to each other. A filler element 6 of vacuum-moulded cellulose fibre is arranged between the board members 2, 3. The board members 2, 3 contribute to the stability and strength of the structural member 1 and can be adapted to provide its external, aesthetic appearance. In alternative embodiments, the first 2 and/or the second 3 board member can be coated with one or several types of surface layers 4 of different materials, in order to give it its desired appearance and/or to provide other properties such as increased bending strength and flexural rigidity, moisture resistance, fire resistance, scratch resistance, etc. (see a more detailed description of the board members and surface layers below).

The filler element 6 is provided in the structural member 1 to make it lighter and stronger, and so that a smaller quantity of solid board material needs to be used in the member 6, which also makes the structural member 1 both cheaper and more environmentally friendly than for example solid wood boards, masonite, chip boards, solid metal plates, or the like having the same dimensions. Furthermore, it increases the strength and durability of the structural member 1.

In the present invention, the filler element 6 is provided for increased strength and increased durability, especially increased bending strength and flexural rigidity, and in order to be light, simple and economically advantageous to produce. In preferred embodiments, it is also adapted to be environmentally friendly, through being produced from recycled material. These properties are achieved through the choice of material, manufacturing method, and a three-dimensional structure that is designed to provide optimum strength properties in relation to the technical limitations and requirements of the production.

Figure 2:
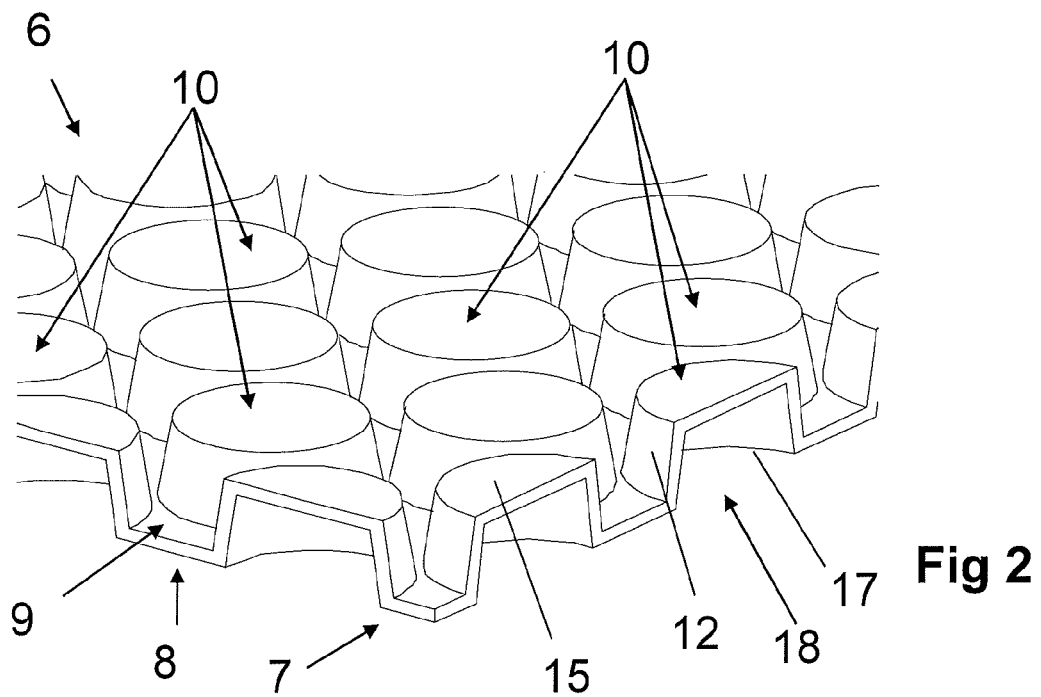
FIG. 2 shows a filler element according to one embodiment of the invention, with cone-shaped cavity structures with closed tops.

FIG. 2 shows a detailed view of a filler element 6 according to one embodiment of the invention. The filler element 6 is made of a continuous sheet of vacuum-moulded cellulose fibre. The sheet has a sheet plane 7 with a bottom side 8 and a top side 9. Even if the sides 8 and 9 in FIG. 2 and in the following examples are designated as bottom 8 and top 9, respectively, it is to be understood that the filler element 6 can just as well be turned around so that the bottom side 8 faces upward and the top side 9 faces downward. Circular, cone-shaped cavity structures 10 are projecting upward on the top side 9 of the sheet plane 7, i.e. all cone-shaped cavity structures 10 are facing in the same direction relative to the sheet plane 7. The bottom side 8 of the sheet plane has a flat surface, perforated by recesses 18 in the base plane 17 of the cone-shaped cavity structures (see also below and e.g. FIG. 7B and FIG. 11B). In the assembled structural member, the largest possible and continuous gluing area in the contact surface between the bottom side of the sheet plane 8 and the bottom board member 3, and thereby a good attachment between these two members and also the largest possible gluing area in the contact surface between the cone tops 15 and the top board member 2, is obtained by having all cone-shaped cavity structures 10 facing in the same direction.

The cone-shaped cavity structures 10 (also called cones in the present text) are provided as truncated cones having a top plane 15 (the top 15 of the cone) and a base plane 17 (the bottom 17 of the cone) that both have substantially the shape of an uninterrupted circle. Expressed in another way, the top plane constitutes a cone section being parallel to the base plane of the cone. In preferred embodiments, the truncated cones are as close to a circular shape as possible, since this yields the best strength in relation to material consumption and dimension. The substantially circular shape of the truncated cones can also be oval, and the orientation of the oval contours can be suitably disposed. The circular shape, with a round bottom 17 and top 15 and cone walls 12 therebetween, makes the filler element 6 substantially more durable than similar filler element with angular, polygonal, or pyramid-shaped cavity structures. In reality, a completely cylindrical shape of the cavity structures would provide the greatest strength in relation to material consumption, but in the present situation this does not allow efficient production. By approximating the cylinder shape with a truncated cone, as in the invention, a possibility for an efficient production of the structural member is also created.

Figure 3:
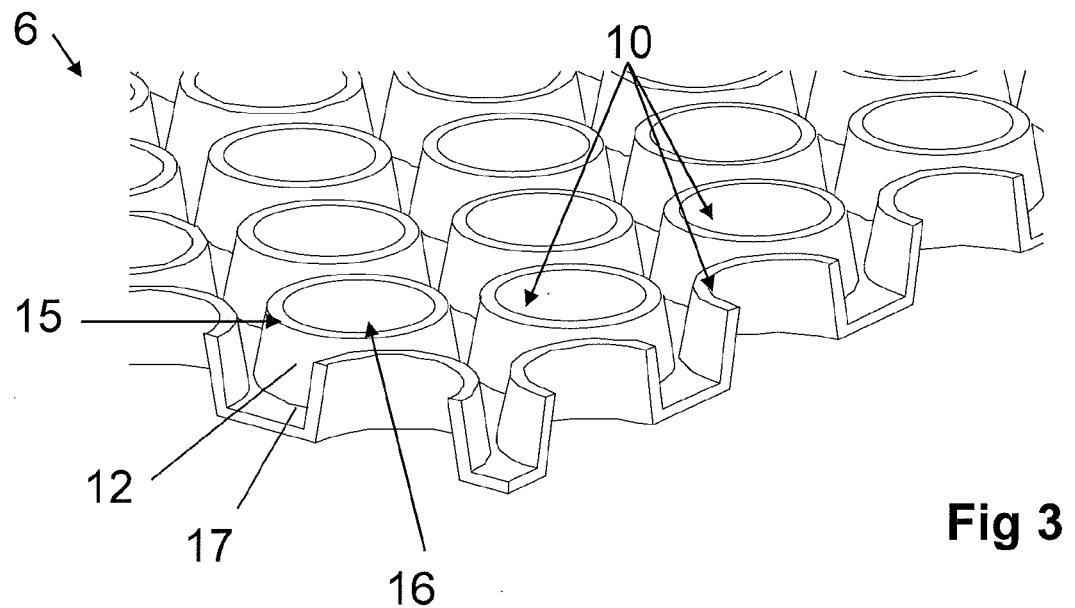
FIG. 3 shows a filler element according to one embodiment of the invention, with cone-shaped cavity structures with open tops.
Figure 4:
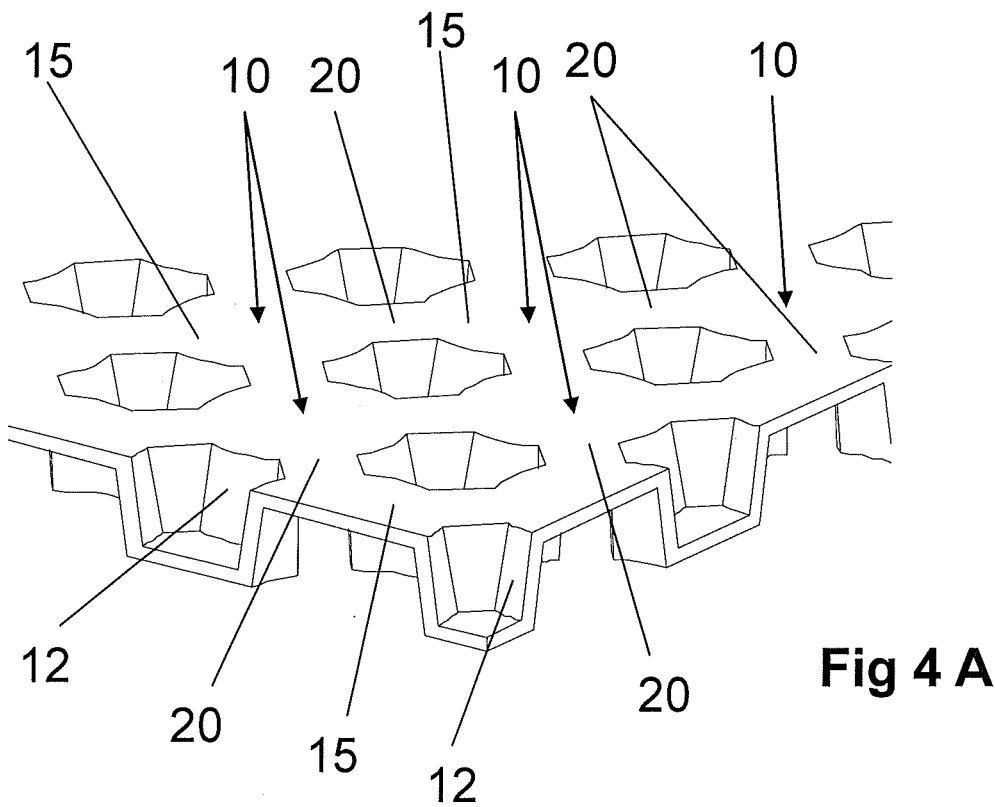
FIGS. 4A and B show filler elements according to two embodiments of the invention, with bridges between the cone-shaped cavity structures and closed tops.
Figure 4:
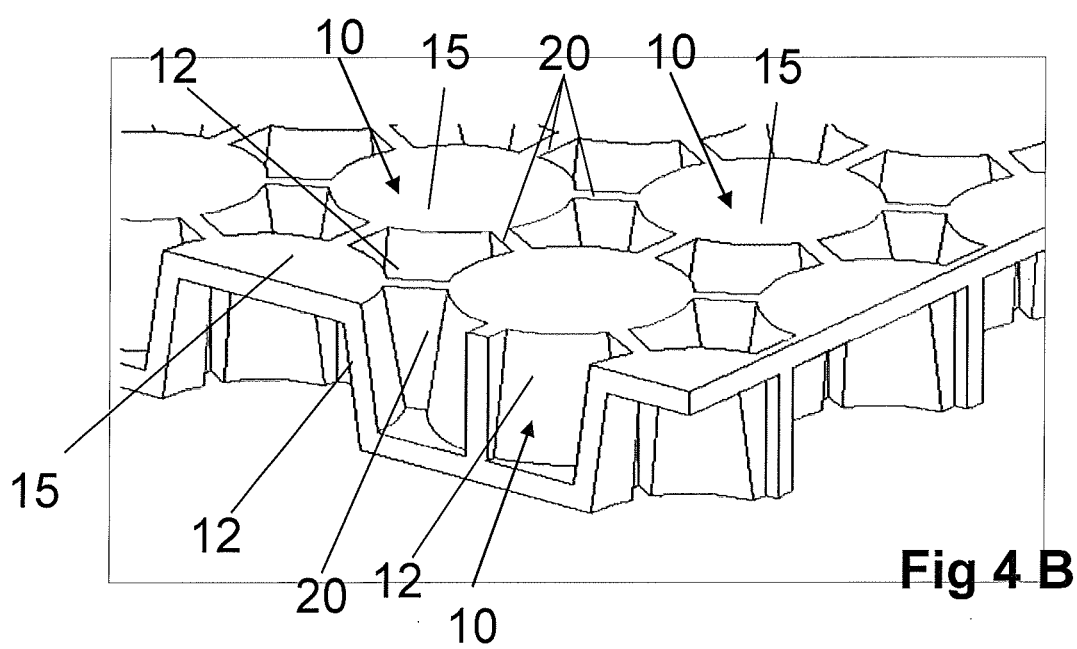
Figure 5:
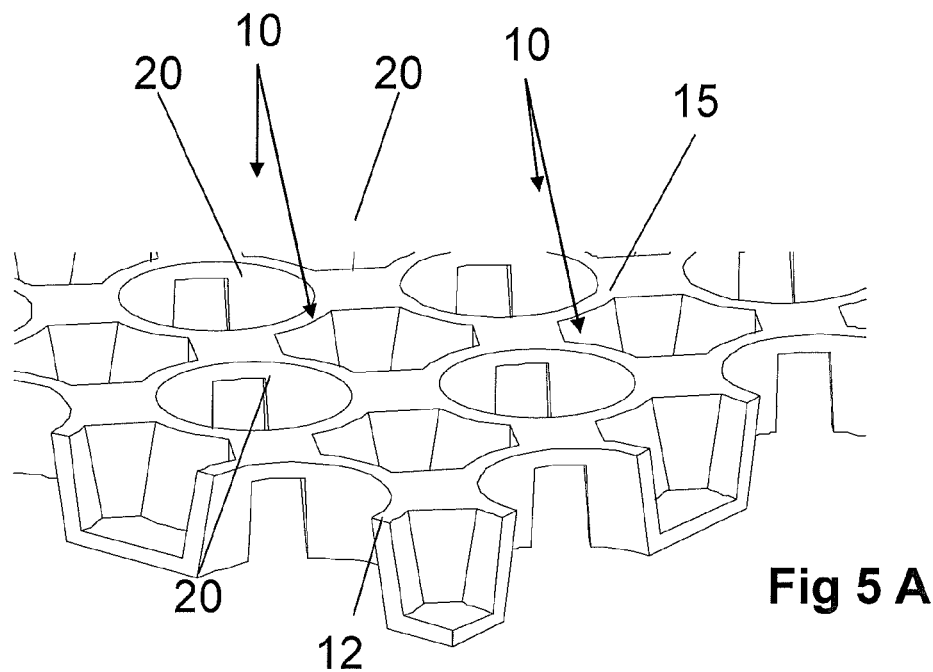
FIGS. 5A and B show filler elements according to two further embodiments of the invention, with bridges between the cone-shaped cavity structures and open tops.
Figure 5:
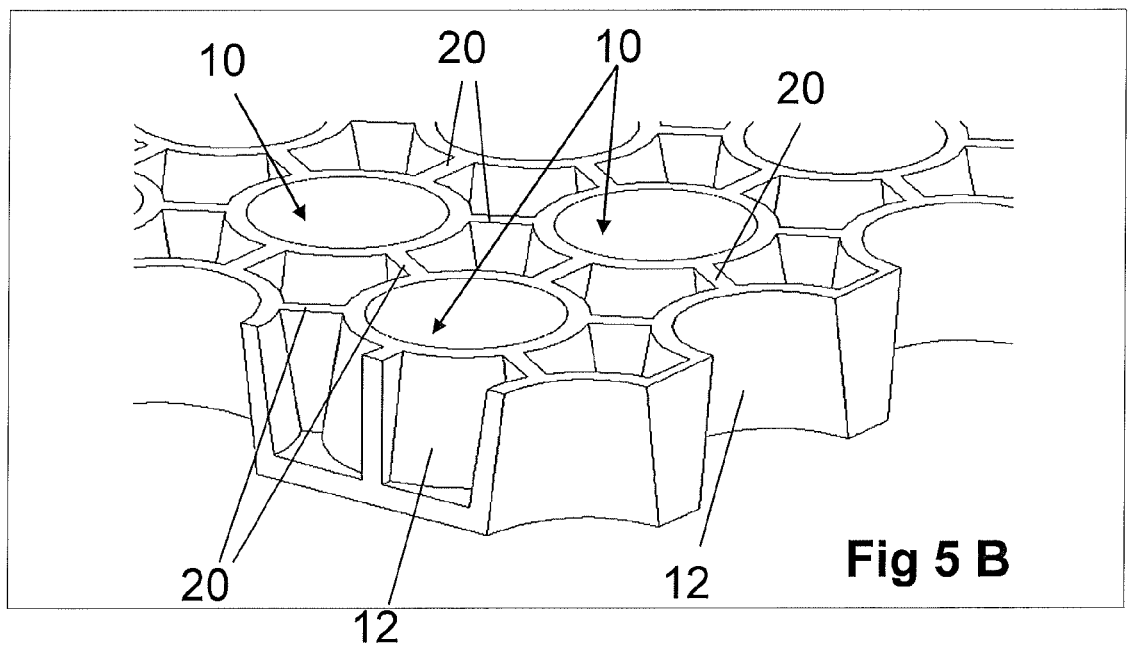

In an embodiment that is advantageous and preferred from a production-technical standpoint, the bottom 17 has an open structure in the form of a recess 18. Accordingly, the bottom 17 shall be understood as the bottom plane of the cone 10, which in this case lacks a fixed bottom. The top 15 is parallel to the sheet plane 7, so that both the bottom side 8 of the sheet plane 7 and the tops 15 will abut closely against the parallel board members 2, 3 when the filler element is placed between them. The top 15 can have a closed shape like a cover, e.g. as shown in FIG. 2, or an open shape with a recess 16, e.g. as shown in FIG. 3. The recess 16 can be as large as the inner diameter of the top 15 of the cone 10, or smaller. The choice between an open or closed top 15 and the size of the recess 16, inter alia, is determined by the size requirement of the contact or gluing area against one of the board members 2, 3 and by production-technical considerations. A larger gluing area (a smaller or no recess 16) provides a stronger adhesion between the filler element 6 and the first board member 2, but can also imply that more moisture and gases are formed inside the structural member 1 when the glue is capable of emitting such gas. To reduce the gas formation, the gluing area, and thereby the glue quantity, is reduced by reducing the area of the top 15.

Figure 6:
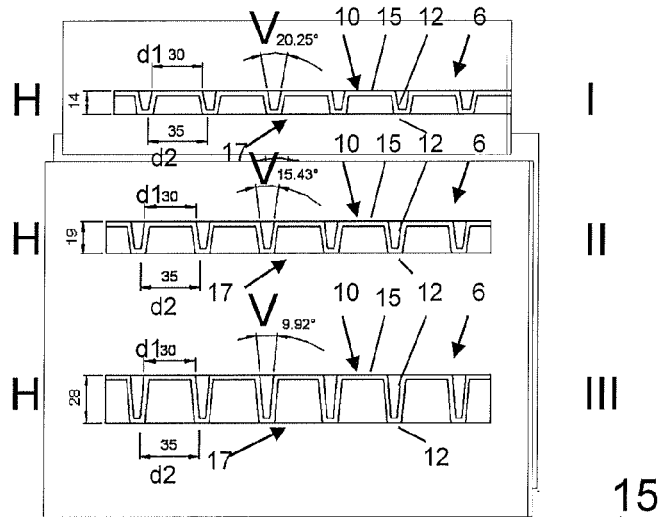
FIG. 6 illustrates how the top diameter, bottom diameter and height of the cone-shaped cavity structures influence the cone angle of the cone-shaped cavity structures.

The diameter of the cone-shaped cavity structures 10, i.e. the diameters of the top 15 and the bottom 17, can be varied depending on the field of use, material and desired performance. In general, it applies that the smaller the diameter, the higher the frequency of cavity structures per unit of area, and thereby the higher the strength and durability. The top 15 and the bottom 17 are interconnected by cone walls 12, the inclination of which relative to the sheet plane, corresponding to half of the cone angle V, is determined by the ratio between the diameters d1, d2 of the top 15 and the bottom 17 and also by the height H of the cone, see FIG. 6. The larger the difference between the diameter d1 of the top 15 and the diameter d2 of the bottom 17 is, the larger the cone angle V, and thereby also the inclination of the cone wall, will become. FIG. 6 illustrates how the height H of the cone wall 12 has an influence on the inclination of the cone wall; if the ratio between the diameters of the top 15 and the bottom 17 is kept constant, the inclination V will become smaller the longer the height H of the cone wall is.

For highest strength and durability of the filler element 6, it is ideal that the diameters d1, d2 of the top 15 and the bottom 17 are as close as possible to each other, that is to say, that the inclination of the cone wall (and the cone angle V) is as small as possible and that the cone-shaped cavity structures 10 have a shape as like a cylinder as possible. Such a shape also enables the cavity structures 10 to be more closely placed, which contributes to increased strength, increased stiffness and a larger gluing area against the board members 2, 3. With the current techniques for vacuum-moulding of, for example, fibre pulp, it is difficult or even impossible from a production-technical standpoint to manufacture moulded sheets having projecting structures with walls perpendicular to the sheet plane. According to the invention, this problem is solved through cone-shaped cavity-structures 10 with walls 12 that are slightly inclined, i.e. the cavity structures 10 are slightly conical in shape, rather than the ideal cylindrical shape. In one preferred embodiment, the truncated cones have a cone angle of approx. 5-45°, or approx. 9-30°, or approx. 9-25°, or approx. 9-15°. FIG. 6 shows examples with a top diameter d1, bottom diameter d2, height H and cone angle V with the following values:

I. d1=30; d2=35; H=14 resulting in a cone angle of V=20.25°.

II. d1=30, d2=35; H=19 resulting in a cone angle of V=15.43°.

III. d1=30, d2=35; H=28 resulting in a cone angle of V=9.92°.

The walls 12 of the cone-shaped cavity structures 10 can be adapted in height H and wall thickness 12 to the purpose for which the structural member 1 is intended and to the desired thickness and performance of the structure member 1, which are also dependent on the materials selected for the filler element and the first and second board member 2, 3. For instance, the height H of the cavity structures 10 can vary between approx. 10 mm and approx. 250 mm, or even higher, depending on future machine-technical limitations. In the same way, the thickness of material of the filler element 6 can be varied so that the thickness of the sheet plane 7 and the walls 12 of the cone-shaped cavity structures 10 and possibly the top 15, and possible other parts, can be adapted depending on field of use and desired performance and also the materials and fibre structure in the filler element 6 and other components of the structural member 1.

FIGS. 4A-B and 5A-B show embodiments where the filler element 6 is additionally reinforced by bridges 20 between each cone-shaped cavity structure 10 and its neighbouring cavity structures 10. The bridges 20 contribute to further increasing the strength of the filler element 6 and its bending strength and flexural rigidity. They can be arranged in different ways, depending on the positioning of the cavity structures 10 and on the desired performance of the material. For example, each cone-shaped cavity structure 10 can be connected to two, four (see FIGS. 4A, 5A) or six (see FIGS. 4B, 5B) of its closest neighbours, by equally many bridges 20.

The bridges can also vary in thickness and in being solid or hollow, i.e. be constituted of two walls with a cavity therebetween. Also in the embodiments with bridges 20, the cone-shaped cavity structures 10 can have a closed (FIGS. 4A-B) or open (FIGS. 5A-B) top 15.

Figure 7A:
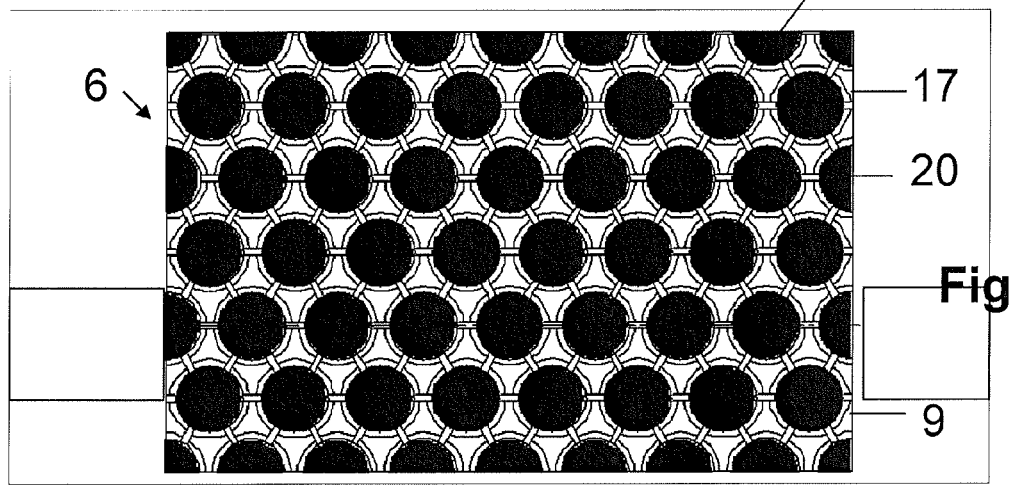
FIGS. 7A and B show a filler element according to one embodiment of the invention, from the top side and bottom side, respectively.
Figure 7B:
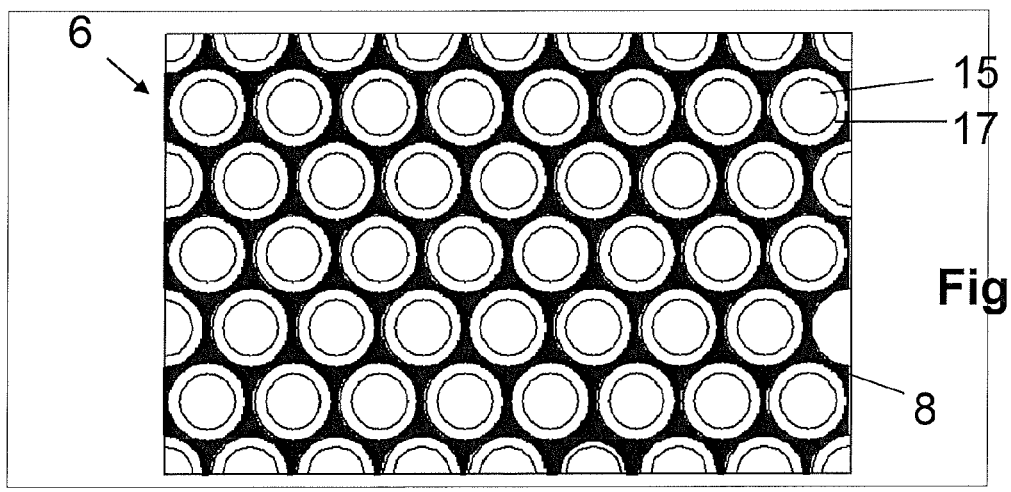

In order to produce a filler element 6 that is as flexurally rigid, strong and durable as possible, the cone-shaped cavity structures 10 are preferably placed in the filler element 6 in parallel rows that are offset relative to each other so that as few continuous lines of weakness (fracture lines) as possible are formed in the transverse, longitudinal and diagonal directions of the board, more preferably so that no continuous line of weakness is formed in the transverse and longitudinal directions of the board, most preferably so no continuous line of weakness at all is formed. In other words, it should preferably not be possible to draw a straight line across the board without it extending through the extension of at least one of the cone-shaped cavity structures 10. This is illustrated in different embodiments and views in FIGS. 7-10. FIG. 7A illustrates a filler element 6 with closed tops 15 and bridges 20 (see the description below) from the top side and FIG. 7B shows the same filler element 6 from the bottom side. The outer circles show the bottoms 17 of the cone-shaped cavity structures 10 and the inner circles show the tops 15 of the cone-shaped cavity structures 10. As is seen in the figures, it is not possible to draw a straight line across the filler element 6 in any direction without intersecting the extension of at least one of the bottoms 17. This results in that there is no continuous line of weakness in the filler element 6, where the material would be resilient and prone to bending. Thus, with this design, the filler element 6 becomes resistant to bending and thereby exceptionally strong, durable and flexurally rigid.

Figure 17A:
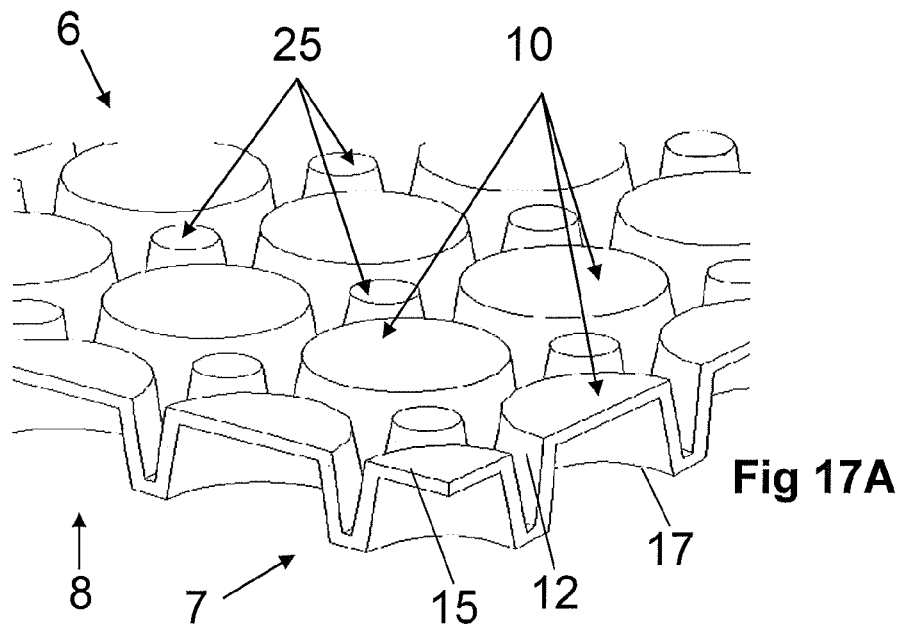
FIG. 17 shows a filler element according to one embodiment of the invention, where continuous lines of weakness have been eliminated by means of a second set of cone-shaped cavity structures positioned in the failure lines; A detailed view, B from the top side, C from the bottom side.
Figure 17B:
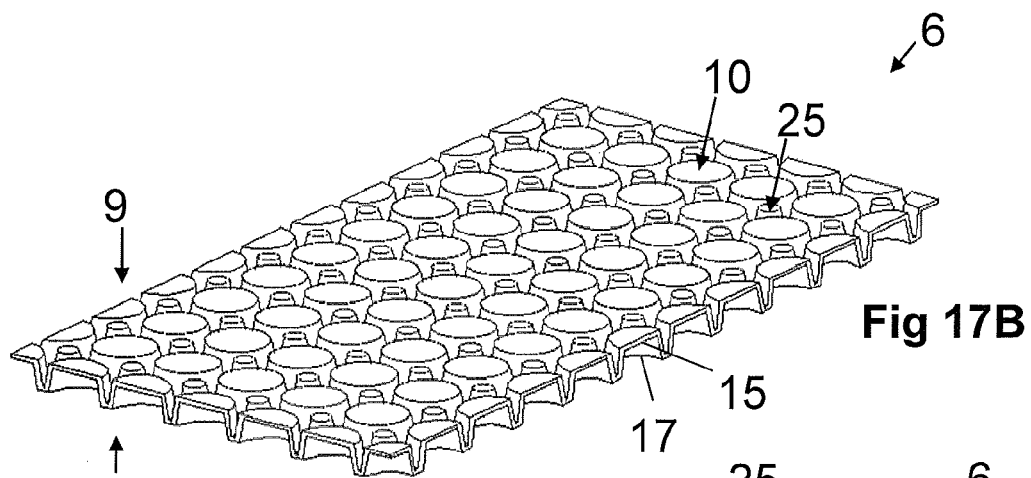
Figure 17C:
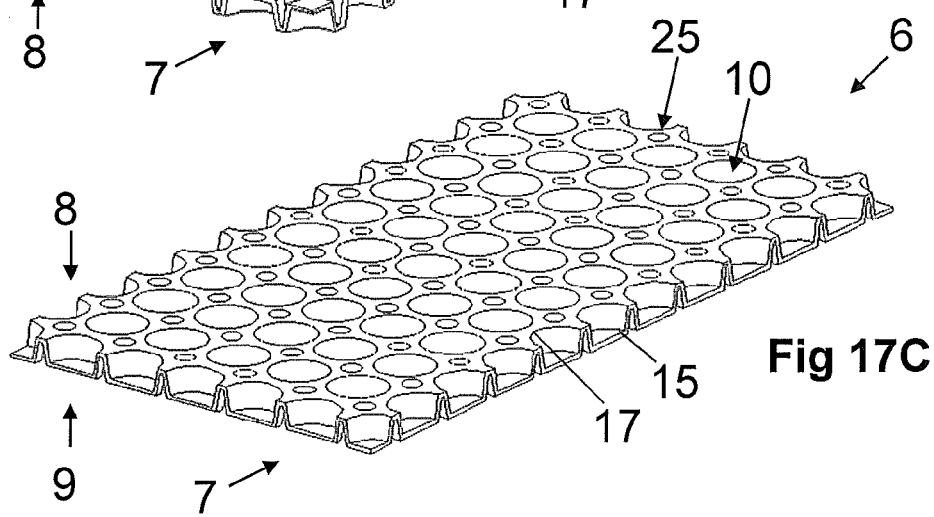

FIG. 17 shows another embodiment of the filler element 6 which has no continuous line of weakness in any direction of the filler element 6. In addition to the first set of cone-shaped cavity structures 10 described above, the filler element 6 comprises a second set of cone-shaped cavity structures 25. The cone-shaped cavity structures 25 in the second set are placed between the cone-shaped cavity structures 10 in the first set, in such a way that they interrupt the failure lines formed by the cone-shaped cavity structures 10 in the first set. To allow accommodation in the gaps, the cone-shaped cavity structures 25 in the second set preferably have a diameter that is smaller than the diameter of the cone-shaped cavity structures 10 in the first set. The maximum height of the cone-shaped cavity structures 25 in the second set is as high as the height of the cone-shaped cavity structures 10 in the first set, preferably the same height as the height of the cone-shaped cavity structures 10 in the first set. Also the second set of cone-shaped cavity structures 25 can have tops with a limiting surface or with a recess.

In this embodiment, it is also not possible to draw a straight line across the filler element 6 in any direction (length-wisely, cross-wisely or diagonally) without intersecting the extension of at least one of the cone-shaped cavity structures 10, 25. This results in that there is no continuous line of weakness in the filler element 6, where the material would be resilient and prone to bending. Thus, also with this design, the filler element 6 becomes resistant to bending and thereby exceptionally strong, durable and flexurally rigid.

Figure 18A:
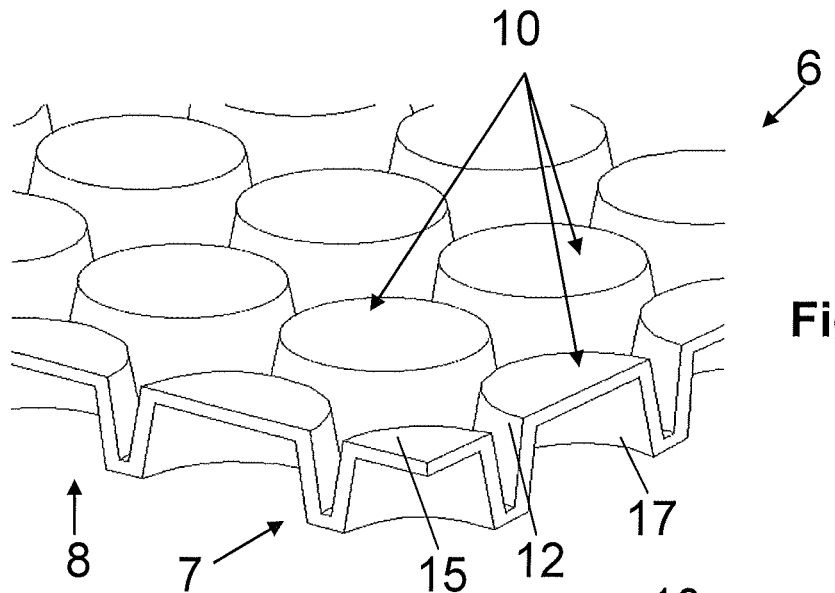
FIG. 18 shows a filler element where the cone-shaped cavity structures are placed in rows parallel to the long and short sides of the filler element, so that continuous lines of weakness are formed both in the transverse and longitudinal directions of the filler element 6.
Figure 18B:
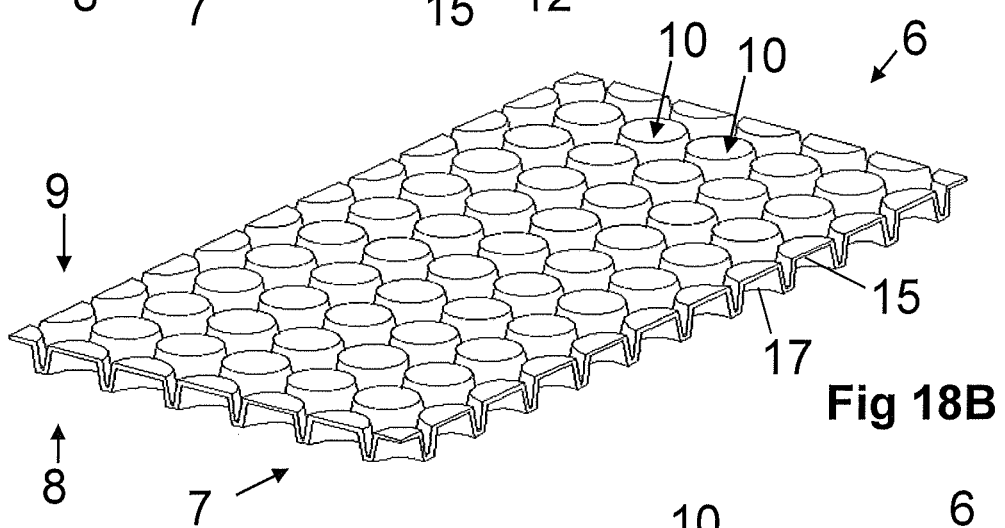
Figure 18C:
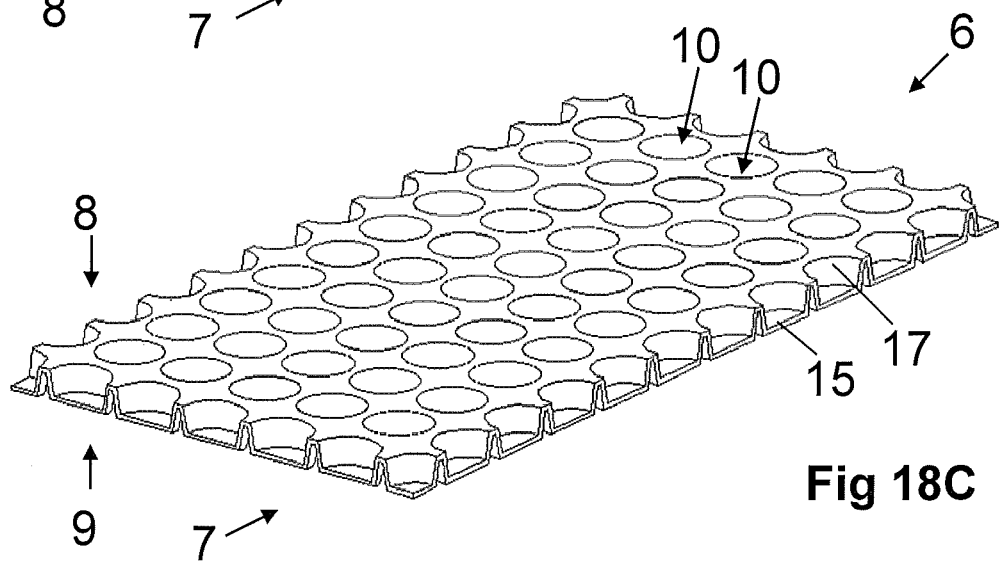

For curved structures, on the other hand, the filler element 6 preferably has continuous lines of weakness so that it becomes easier and softer to bend. FIG. 18 shows one embodiment of a filler element 6 where the cone-shaped cavity structures 10 are placed in rows parallel to the long and short sides of the element 6, without offset relative to each other. In this way, continuous lines of weakness are formed both in the transverse and longitudinal directions of the filler element 6. Such a filler element 6 is advantageously used in structural members 1 having a curved shape, either in the longitudinal direction, in the transverse direction or in both directions. If a similar design, with parallel rows of cone-shaped cavity structures 10 either in the longitudinal or transverse direction, is maintained, but the cone-shaped cavity structures 10 are offset relative to each other in one of the directions, a filler element 6 having an continuous line of weakness in either the longitudinal or transverse direction, but not in both directions, is obtained. Such a filler element 6 can be used in structures that require stiffness in one direction (longitudinal or transverse), but need to be flexible in the other direction. The same applies to the embodiments in FIGS. 2, 3, 11 and 12, with the difference that the continuous lines of weakness in these embodiments run diagonally and the filler element 6 therefore becomes more flexible diagonally. The embodiments in FIGS. 2, 3, 11 and 12 (with continuous lines of weakness diagonally), on the contrary, are more flexurally rigid in the transverse and longitudinal direction than the embodiment in FIG. 18 and are therefore more suitable than these as filler elements in structures that are planar and require more flexural rigidity in the transverse and longitudinal direction. Like in the other embodiments, the filler element shown in FIG. 18 can have cone-shaped cavity structures 10 with tops having a limiting surface or a recess.

Figure 8:
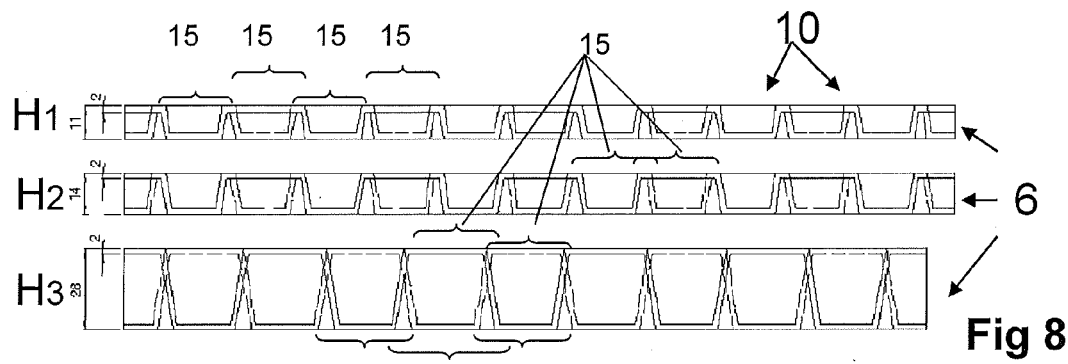
FIG. 8 shows filler elements according to different embodiments of the invention from the side.
Figure 9:
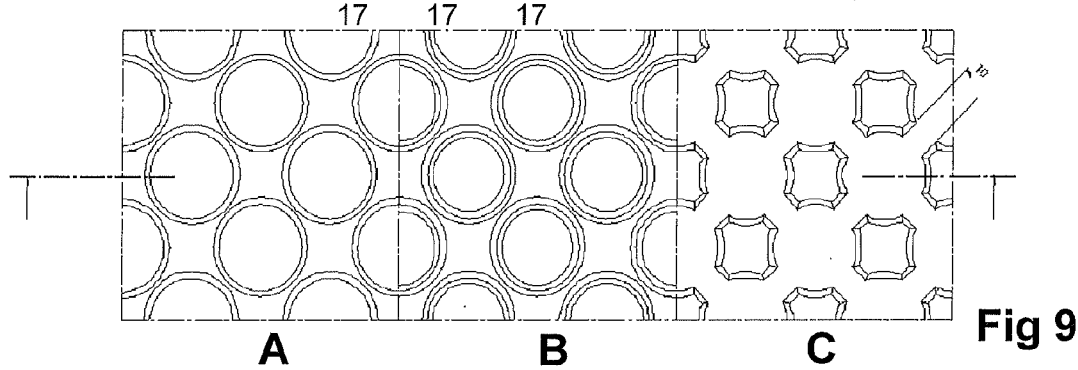
FIG. 9 shows filler elements according to different embodiments of the invention from above.
Figure 10:
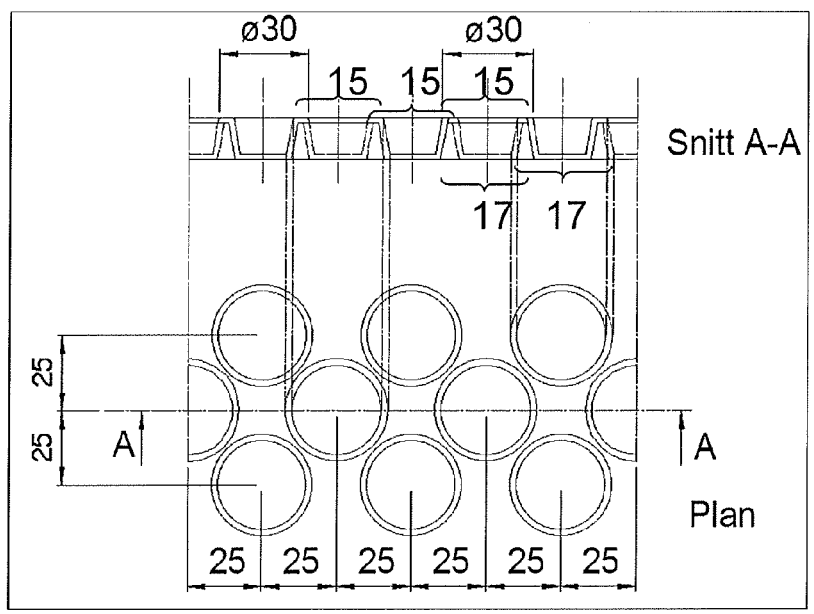
FIG. 10 shows a filler element according to one embodiment of the invention, from the side and from above, in order to illustrate the offset of the cone-shaped cavity structures relative to each other in one embodiment.

FIGS. 8-10 show similar designs in different embodiments and from different perspectives. FIG. 8 shows three filler elements 6 with different height $H_1$-$H_3$ of the cone wall 12, in cross-section. Filled lines illustrate cone-shaped cavity structures 10 situated in a first row, closest to the viewer. Dashed lines show cone-shaped cavity structures 10 situated in a row beyond the first row and are thus partially obscured by the first row. The braces indicate the extension of the tops 15 and bottoms 17 of the cavity structures 10 in the respective row. The cone-shaped cavity structures 10 are overlapping each other in adjacent rows. This is also shown in views from above of the filler element 6, in different embodiments in FIG. 9, where FIG. 9A shows a filler element 6 with closed tops 15, FIG. 9B shows a filler element 6 with open tops 15, and FIG. 9C shows a filler element 6 with closed tops 15 and bridges 20. FIG. 10 also illustrates an embodiment, both in cross-section and from above, with typical ratios between the diameter of the cone-shaped cavity structures 10 and their positioning relative to each other so that they are placed overlapping.

Figure 11A:
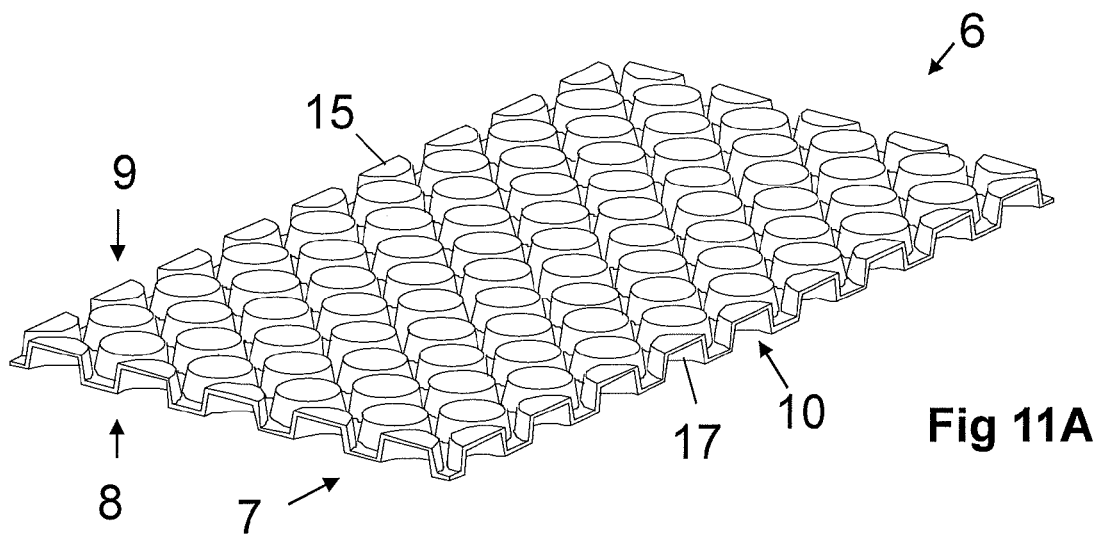
FIGS. 11A and B show a filler element according to one embodiment of the invention, with closed cone tops, from the top and bottom side, respectively.
Figure 11B:
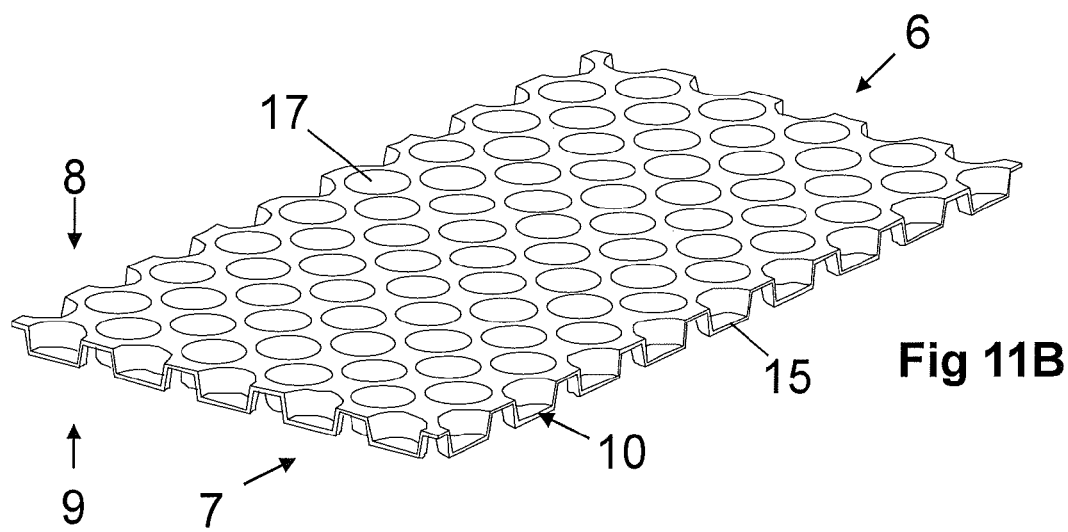
FIG. 11C shows a structural member according to one embodiment of the invention with the filler element according to FIGS. 11A and B.
Figure 11C:
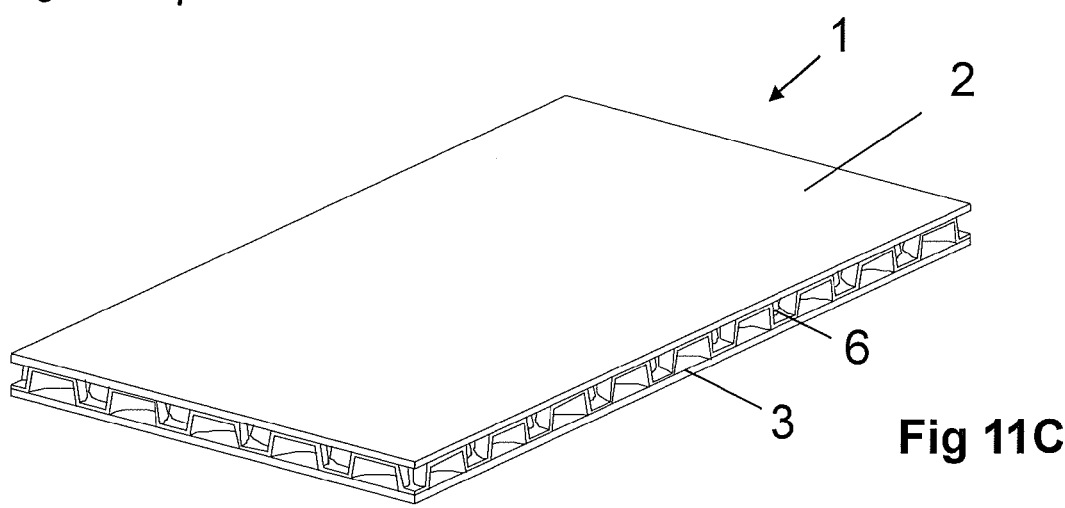

FIGS. 11-14 show different embodiments of the filler element 6 according to the present invention and illustrate examples of, inter alia, how gluing area and performance of the element 6 can be varied. FIG. 11 shows a filler element 6 with closed cone tops 15 and without bridges 20, from above (FIG. 11A), from below (FIG. 11B) and mounted in a structural member 1 (FIG. 11C). FIG. 11B shows that the bottom side 8 of the sheet plane 7 has a continuous and flat gluing area which is interrupted by the open bottoms 17 of the cone-shaped cavity structures 10. On the top side 9 of the sheet plane 7 (FIG. 11A), the gluing area is constituted of the flat surfaces constituted of the tops 15 of the cone-shaped cavity structures 10. The distribution of the gluing areas on the top side 9 and bottom side 8, respectively, of a similar filler element 6 with closed tops 15 and bridges is also illustrated in FIGS. 7A and B, where the gluing areas correspond to the black portions.

Figure 12A:
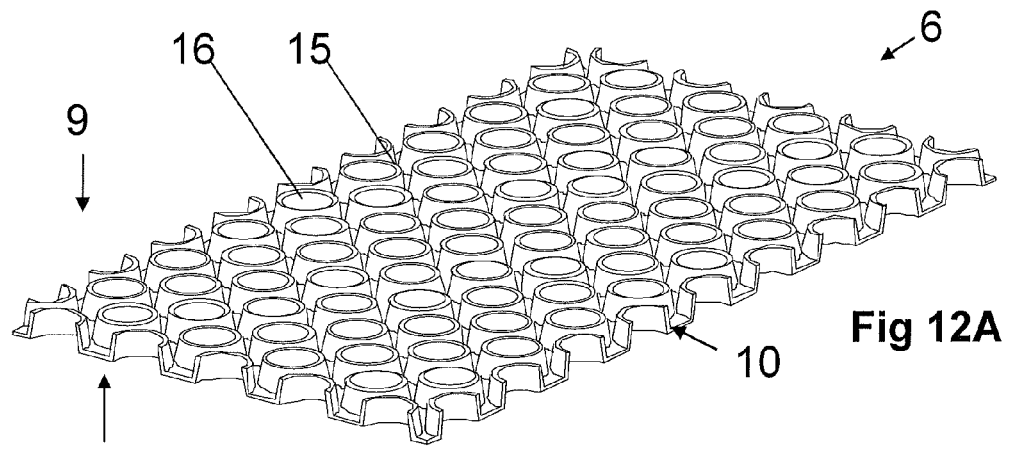
FIGS. 12A and B show a filler element according to one embodiment of the invention, with open cone tops, from the top and bottom side, respectively.
Figure 12B:
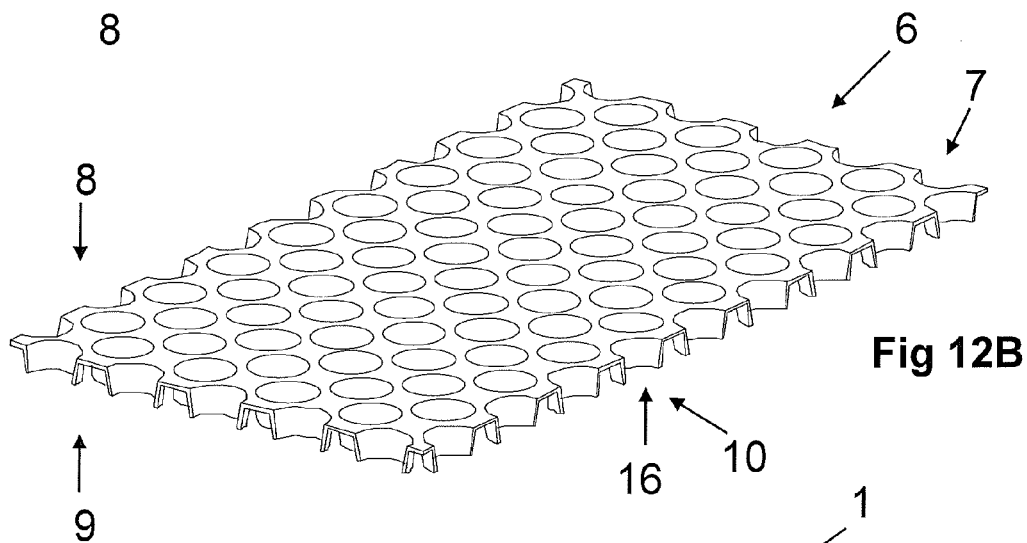
FIG. 12C shows a structural member according to one embodiment of the invention with the filler element according to FIGS. 12A and B.
Figure 12C:
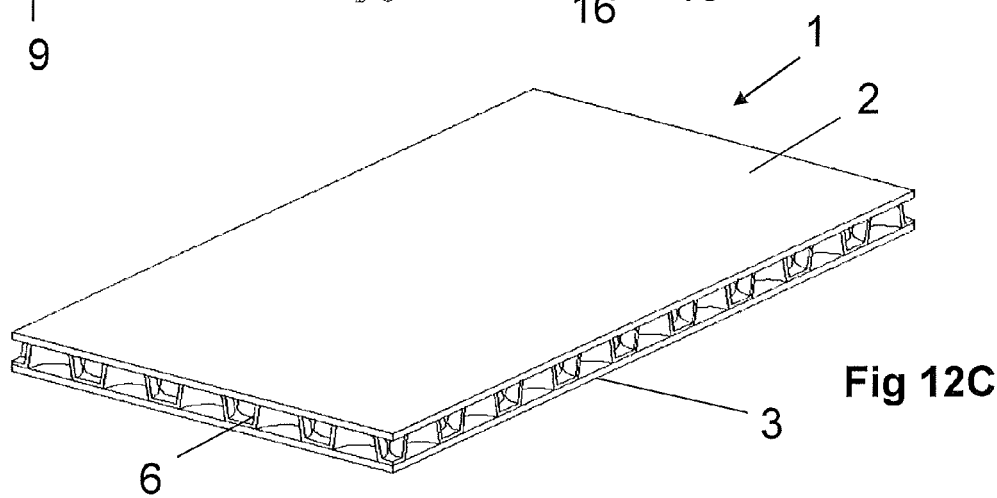

FIG. 12 shows a filler element 6 with open cone tops 15 and without bridges 20, from above (FIG. 12A), from below (FIG. 12B) and mounted in a structural member 1 (FIG. 12C). FIG. 12B shows that the bottom side 8 of the sheet plane 7, in a similar way as in the embodiment in FIG. 11, has a continuous and flat gluing area that is interrupted by the open bottoms 17 of the cone-shaped cavity structures 10. On the top side 9 of the sheet plane 7, the gluing area is constituted of the tops 15 of the cone-shaped cavity structures 10, which in this case are open. In the example illustrated in FIG. 12, the tops 15 are completely open, i.e. the recess 16 is equally large as the inner diameter of the top 15, so that the gluing area is only constituted of the cross-sectional surface of the cone wall 12. In other embodiments, the gluing area can be varied by varying the size of the recess 16.

Figure 13A:
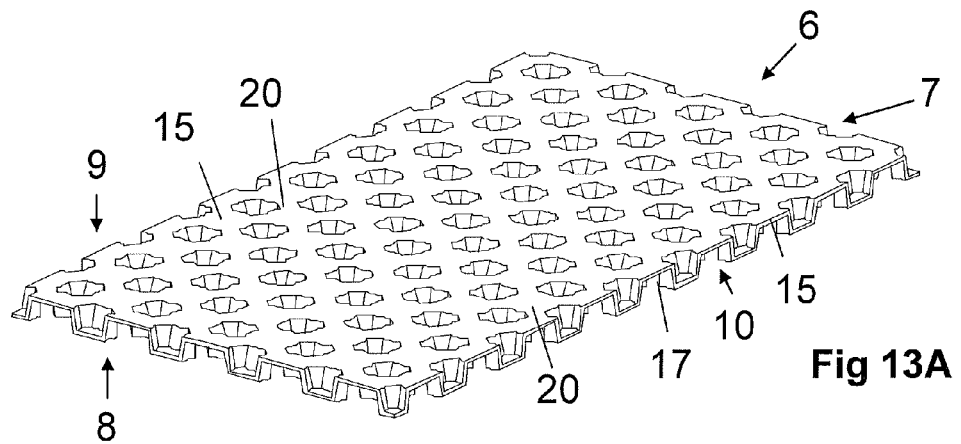
FIGS. 13A and B show a filler element according to one embodiment of the invention, with bridges and closed cone tops, from the top and bottom side, respectively.
Figure 13B:
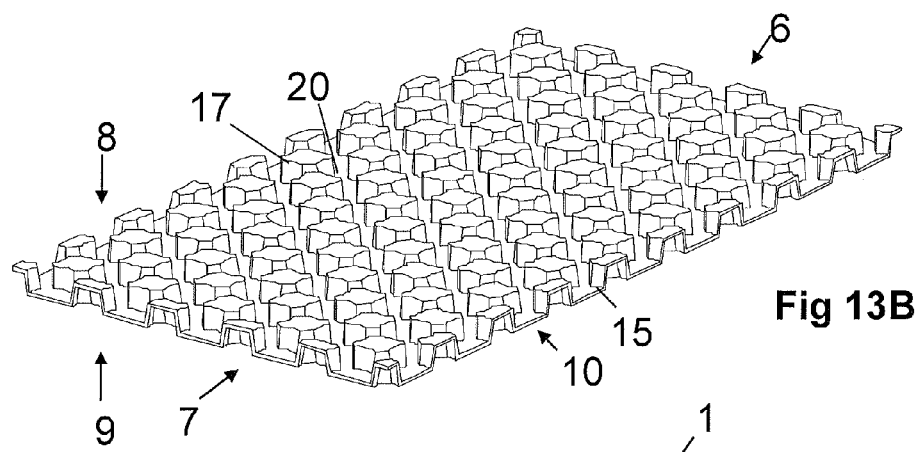
FIG. 13C shows a structural member according to one embodiment of the invention with the filler element according to FIGS. 13A and B.
Figure 13C:
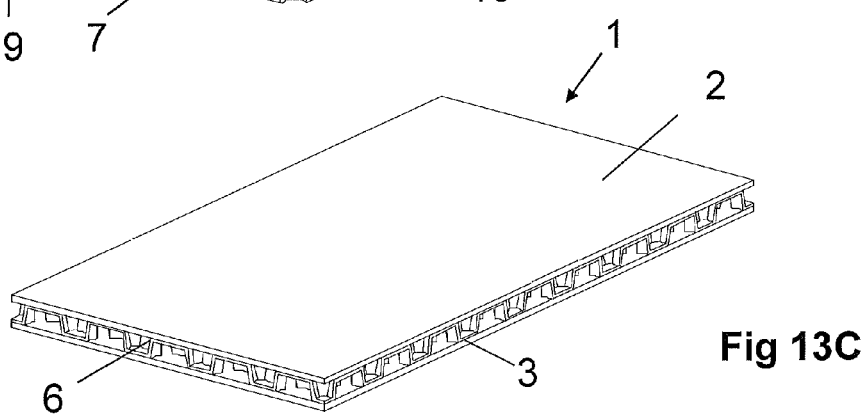

FIG. 13 shows a filler element 6 with closed cone tops 15 and with bridges 20, from above (FIG. 13A), from below (FIG. 13B) and mounted in a structural member 1 (FIG. 13C). FIG. 13B shows that the bottom side 8 of the sheet plane 7 has a continuous and flat gluing area that is interrupted by the open bottoms 17 of the cone-shaped cavity structures 10. On the top side 9 of the sheet plane 7 (FIG. 13A), the gluing area is constituted of the flat, continuous surface constituted of the tops 15 of the cone-shaped cavity structures 10 and of the extension of the bridges 20.

Figure 14A:
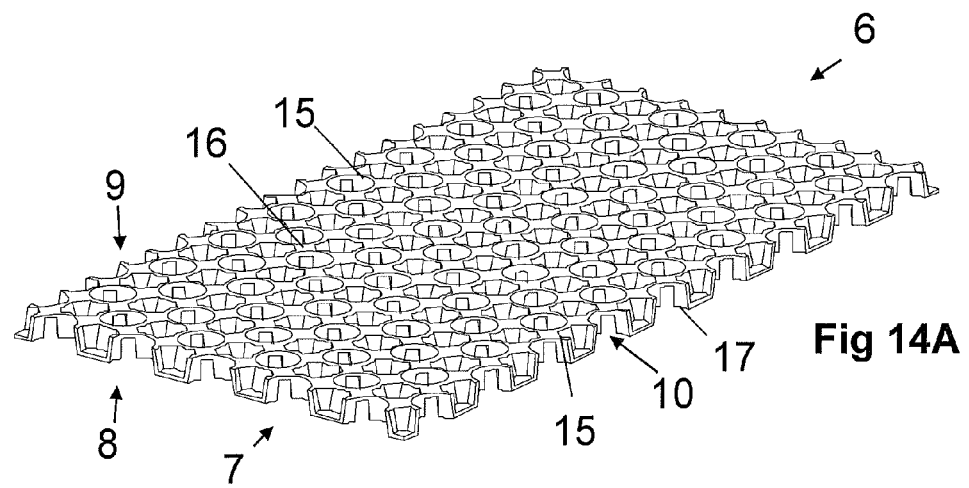
FIGS. 14A and B show a filler element according to one embodiment of the invention, with bridges and open cone tops, from the top and bottom side, respectively.
Figure 14B:
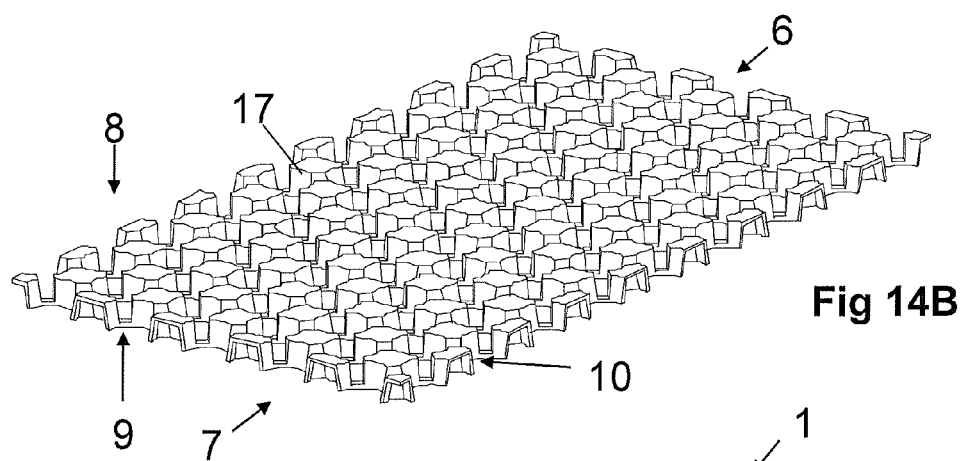
FIG. 14C shows a structural member according to one embodiment of the invention with the filler element according to FIGS. 14A and B.
Figure 14C:
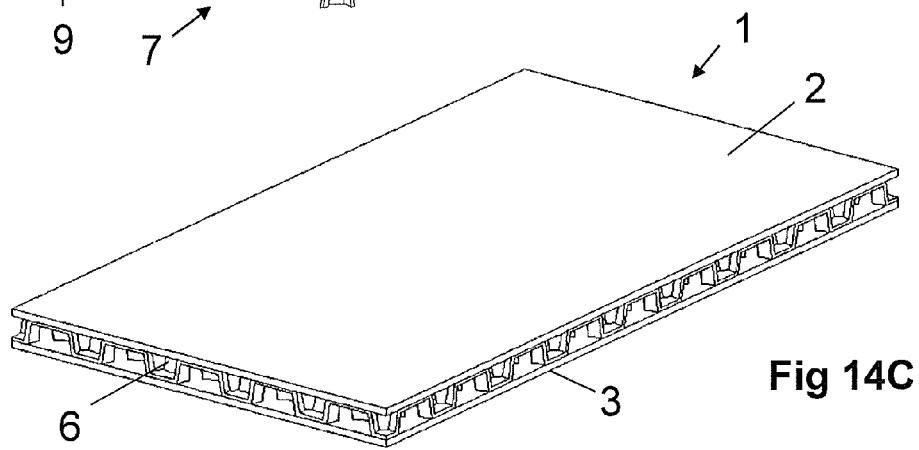

FIG. 14 shows a filler element 6 with open cone tops 15 and with bridges 20, from above (FIG. 14A), from below (FIG. 14B) and mounted in a structural member 1 (FIG. 14C). FIG. 14B shows that the bottom side 8 of the sheet plane 7 has a continuous and flat gluing area that is interrupted by the open bottoms 17 of the cone-shaped cavity structures 10. On the top side 9 of the sheet plane 7, the gluing area is constituted by the tops 15 of the cone-shaped cavity structures 10, which in this case are open, and by the extension of the bridges 20. In the example illustrated in FIG. 12, the tops 15 are completely open, i.e. the recess 16 is equally large as the inner diameter of the top 15, so that the gluing area is constituted of the cross-sectional surface of the cone wall 12 and the bridges 20. In other embodiments, the gluing area can be varied by varying the size of the recess 16.

The filler element 6 is formed, for example, by vacuum-moulding of aqueous cellulose pulp (pulp slurry) that is suctioned into a perforated mould having a geometry matching the desired geometry of the filler element, i.e. in positioning, size and height of the cone-shaped cavity structures 10. After the vacuum-moulding, the fibre pulp is dried and, if required, post-pressed in a moulding press.

The cellulose pulp can have different composition, in a preferred and environmentally friendly embodiment it comprises recycled paper or a mixture of recycled paper and virgin fibres or recycled paper and PLA (polylactic acid, a biologically degradable plastic made of starch and sugar). In another embodiment, the cellulose pulp comprises virgin cellulose pulp or a mixture of virgin cellulose pulp and PLA.

In the manufacturing process, or in a post-treatment, the cellulose pulp can be treated so that it becomes resistant to e.g. moisture, fire and/or pests and the like, depending on the field of use.

Figure 15:
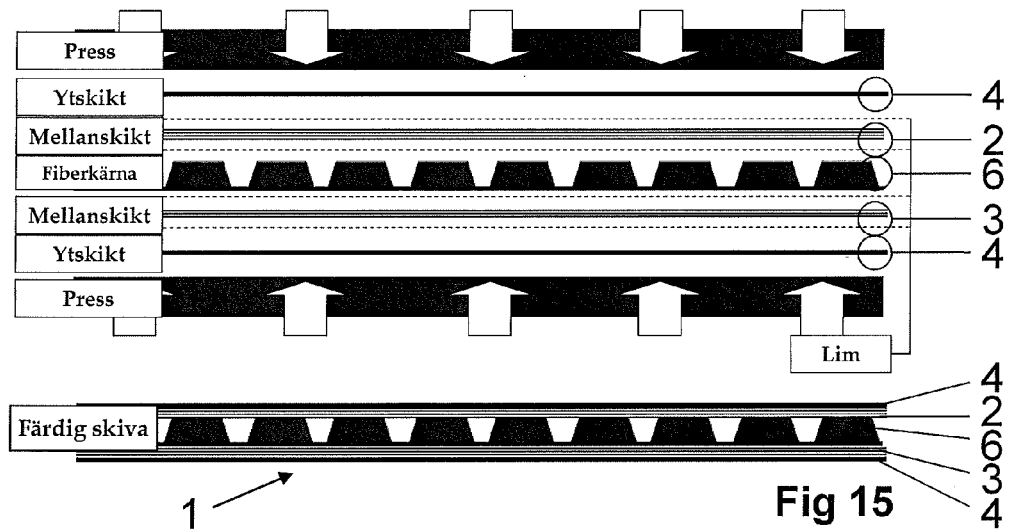
FIG. 15 shows a method of manufacturing a structural member according to one embodiment of the invention.

The structural member 1 is manufactured by joining together the board members 2, 3 with an intermediate filler element 6 according to the sandwich principle, preferably by gluing, or welding for materials where this is suitable. FIG. 15 shows how a structural member 1 according to the present invention can be assembled in an "all-in-one pressing operation". The filler element 6 is placed between the first 2 and the second 3 board member, which possibly in their turn are placed between one or several surface layers 4. Glue is distributed between all the respective components and thereupon the entire structure is compressed in a press. The type of glue is adapted to the material composition. In other embodiments, the structural member 1 can be assembled stepwise and/or by methods that are adapted to the selected materials. A structural member 1 with two board members 2, 3 and an intermediate filler element 6 can also be manufactured according to the sandwich principle, to be coated with different surface materials such as veneer, paper, plastic, laminate, varnish, etc. in a subsequent step. Furthermore, edge strips of different materials can be added.

The structural member 1 can be manufactured of a number of different material combinations. For example, the board members 2, 3 and/or the surface layers can be made of wood, wood substitute, composite material, paper, aluminium, plastic or steel. The two board members 2, 3 and possible surface layers can be made of the same or different materials. In one environmentally friendly and above-described embodiment, the filler element 6 is made of vacuum-moulded cellulose pulp, which can be recycled and/or reinforced with other fibres or e.g. PLA. The filler element 6 can also be made of moulded wood substitute, composite, aluminium, plastic or steel. Also the filler element 6 can be made of the same or of different materials than the board members 2, 3 and/or the surface layers 4. Accordingly, the structural member 1 can be made of the same material throughout or of different combinations between the different components 2, 3, 4, 6.

The structural member 1 according to the present invention can be manufactured in different shapes and dimensions. For large-scale industrial production, the size of the filler element is 1500×2500 mm, but both larger and smaller sizes are conceivable and usable in different contexts. The structural member 1 can also be cut, sawed and machined into desired shapes and possibly be provided with edge strips when required.

Figure 16:
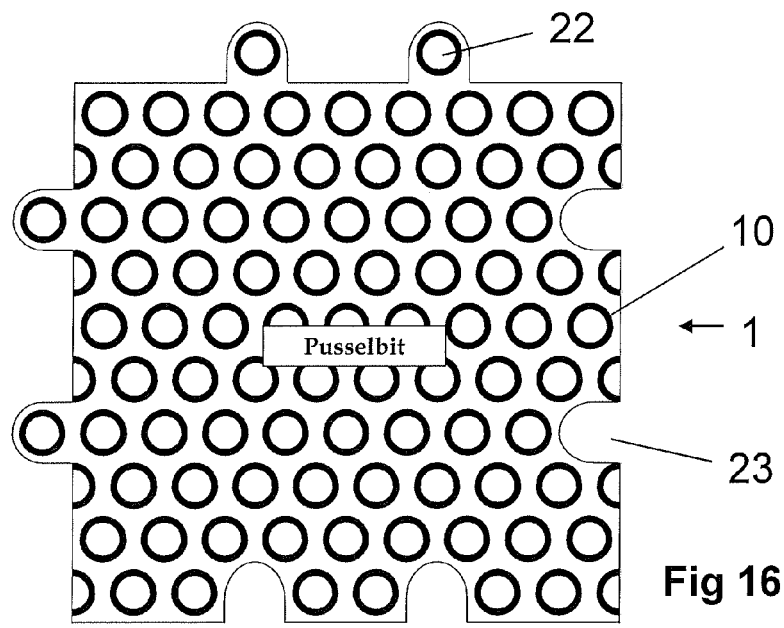
FIG. 16 shows a structural member, according to one embodiment of the invention, which is easily assembled with other structural members according to the invention.

FIG. 16 shows one embodiment of the structural member 1 according to the present invention, where the position of the filler element 6 between the board members 1 is schematically indicated by drawing the cone-shaped cavity structures 10. The structural member 1 is designed with projections 22 and recesses 23 enabling interconnection of one structural member 1 to another one with corresponding complementary projections 22 and recesses 23, according to the jigsaw puzzle principle. Such jigsaw piece-structural members 1 can easily be assembled for constructing larger structural members.

The structural member 1 according to the present invention is a light, bending resistant, flexurally rigid and preferably environmentally friendly and recyclable construction board that has a multitude of different fields of application in different embodiments and choices of material. Among other things, the structural member 1 can be used for furniture and decorating, in building structures and for structures in vehicles, such as walls in trucks, buses, caravans, horse and cattle trailers, trains, and airplanes.

The invention claimed is:

1. A structural member comprising:
a first and a second board member, which are arranged in parallel to each other; and
a filler element arranged between the first board member and the second board member, wherein the filler element is a continuous sheet, with a sheet plane that is substantially parallel to the first and the second board member, said filler element being moulded or vacuum-moulded so that a first set of cone-shaped cavity structures project outward from the sheet plane;
wherein:
said first set of cone-shaped cavity structures are arranged as truncated cones having a top and a bottom, both having a substantially circular shape;
one side of the sheet plane has a continuous, flat surface;
that the cone-shaped cavity structures project outward on the other side of the sheet plane;
the cone-shaped cavity structures have a cone angle (V) of approx. 5-45°;
the filler element is made of vacuum-molded cellulose pulp; and
the vacuum-molded cellulose pulp is reinforced with polylactic acid (PLA).

2. The structural member according to the claim 1, wherein the cone angle is 9-25°.

3. The structural member according to claim 1, wherein the cone-shaped cavity structures of said first set are arranged relative to each other so that no continuous line of weakness is formed in the transverse, longitudinal or diagonal directions of the board.

4. The structural member according to claim 1, wherein the cone-shaped cavity structures of said first set are arranged in parallel rows relative to each other, with an offset relative to each other so that no continuous line of weakness is formed in the transverse and longitudinal directions of the board.

5. The structural member according to claim 1, wherein the cone-shaped cavity structures of said first set are arranged in rows parallel to the long and short sides of the filler element, without offset relative to each other, so that continuous lines of weakness are formed in the transverse and longitudinal directions of the board.

6. The structural member according to claim 1, wherein the cone-shaped cavity structures of said first set are arranged in rows parallel to the long and short sides of the filler element with an offset relative to each other, so that continuous lines of weakness are formed only in one of the transverse and longitudinal directions of the board.

7. The structural member according to claim 1, further comprising a second set of cone-shaped cavity structures, placed between the cone-shaped cavity structures of the first set in such a way that no continuous line of weakness is formed in any of the transverse, longitudinal or diagonal directions of the board.

8. The structural member according to claim 1, wherein the cone-shaped cavity structures of said first set are interconnected to adjacent cone-shaped cavity structures of said first set by intermediate bridges.

9. The structural member according to claim 1, wherein the tops of the cone-shape cavity structures of the first set and/or the second set have a limiting surface.

10. The structural member according to claim 1, wherein the tops of the cone-shape cavity structures of the first set and/or the second set have a recess.

11. The structural member according to claim 1, wherein the filler element is made of one of moulded wood substitute, composite, aluminium, plastic or steel.

12. The structural member according to claim 1, wherein the first and second board members are made of one of the materials wood, wood substitute, composite, paper, aluminium, plastic or steel, or of combinations thereof.

13. The structural member according to claim 1, wherein the filler element is made of vacuum-moulded cellulose pulp, and the first and second board members are made of one of the materials wood, wood substitute, composite, paper, aluminium, plastic or steel, or of combinations thereof.

* * * * *